United States Patent

Huignard et al.

Patent Number: 5,402,261
Date of Patent: Mar. 28, 1995

[54] PHASE CONJUGATION DEVICE

[75] Inventors: Jean-Pierre Huignard; Frédéric Dizier, both of Paris, France

[73] Assignee: Thomson-CSF, Puteaux, France

[21] Appl. No.: 121,868

[22] Filed: Sep. 17, 1993

[30] Foreign Application Priority Data

Sep. 18, 1992 [FR] France .................. 92 11145

[51] Int. Cl.⁶ ............................. G02B 26/08
[52] U.S. Cl. ...................... 359/300; 359/721; 372/21
[58] Field of Search ............ 359/300, 721, 24, 652, 359/653, 654, 663, 667, 494, 495, 497, 15, 19, 20; 372/21

[56] References Cited

U.S. PATENT DOCUMENTS

| | | | |
|---|---|---|---|
| 4,063,795 | 12/1977 | Huignard et al. | 359/7 |
| 4,229,071 | 10/1980 | d'Auria et al. | 359/254 |
| 4,286,838 | 9/1981 | Huignard et al. | 372/50 |
| 4,306,763 | 12/1981 | Huignard | 359/19 |
| 4,403,352 | 9/1983 | Huignard et al. | 359/109 |
| 4,442,455 | 4/1984 | Huignard et al. | 358/209 |
| 4,451,151 | 5/1984 | Huignard | 356/345 |
| 4,451,442 | 5/1984 | Loiseaux et al. | 423/224 |
| 4,456,327 | 6/1984 | Huignard et al. | 359/10 |
| 4,483,592 | 11/1984 | Aubonig et al. | 356/342 |
| 4,491,867 | 1/1985 | Huignard | 358/164 |
| 4,505,536 | 3/1985 | Huignard et al. | 359/7 |
| 4,514,038 | 4/1985 | Yichon et al. | 359/306 |
| 4,543,662 | 9/1985 | Huignard et al. | 359/109 |
| 4,576,434 | 3/1986 | Huignard et al. | 359/7 |
| 4,586,779 | 5/1986 | Huignard et al. | 359/7 |
| 4,592,618 | 6/1986 | Huignard et al. | 359/7 |
| 4,639,091 | 1/1987 | Huignard et al. | 359/48 |
| 4,720,634 | 1/1988 | d'Auria et al. | 250/551 |
| 4,818,052 | 4/1989 | LePesant et al. | 385/17 |
| 4,836,629 | 6/1989 | Huignard et al. | 359/15 |
| 4,847,521 | 7/1989 | Huignard et al. | 307/425 |
| 4,877,312 | 10/1989 | Huignard et al. | 359/243 |
| 4,880,295 | 11/1989 | Rockwell et al. | 372/21 |
| 4,936,660 | 6/1990 | Clendening, Jr. et al. | 359/300 |
| 4,964,718 | 10/1990 | Van Hoogstrate et al. | 359/721 |
| 5,072,135 | 12/1991 | Huignard et al. | 359/327 |
| 5,075,573 | 12/1991 | Huignard et al. | 359/326 |
| 5,097,478 | 3/1992 | Verdiell et al. | 372/94 |
| 5,117,296 | 5/1992 | Hoebing | 359/21 |
| 5,121,400 | 6/1992 | Verdiell et al. | 372/32 |
| 5,122,766 | 6/1992 | Huignard et al. | 333/144 |
| 5,123,025 | 6/1992 | Papuchon et al. | 372/72 |
| 5,150,241 | 8/1992 | Joffre et al. | 359/89 |
| 5,222,093 | 6/1993 | Pocholle et al. | 372/72 |

OTHER PUBLICATIONS

U.S. patent application 07/460974, filing date Jun. 23, 1989, Refregier.
U.S. patent application 07/845789, filing date Mar. 9, 1992, Refregier.
U.S. patent application 08/058229, filing date May 10, 1993, Refregier, U.S. Pat. No. 5,317,651.

Primary Examiner—Loha Ben
Assistant Examiner—Thomas Robbins
Attorney, Agent, or Firm—Oblon, Spivak, McClelland, Maier & Neustadt

[57] ABSTRACT

The phase conjugation device includes at least one non-linear medium and an optical focussing system producing at least two focal points within the non-linear medium and capable of focussing light at these two points.

10 Claims, 2 Drawing Sheets

PHASE CONJUGATION DEVICE

BACKGROUND OF THE INVENTION

1. Field of the invention

This invention provides a phase conjugation device and, in particular, a device to generate an optical wave whose phase is the conjugate of an incident wave, in a non-linear medium. In particular, the invented device aims to improve the spatial quality of laser beams by phase conjugation, for example by Brillouin phase conjugation in a high-pressure gas cell. The optical configuration of the invention ensures very high stability of the conjugate wave reflectivity and very effectively limits unwanted effects such as breakdown of the medium and beam autodefocussing.

2. Discussion of Background

In the conventional configuration, represented in FIG. 1, the conjugate wave is produced by focussing the incident wave in a high-pressure gas ($CH_4$, $Xe$, $N_2$, etc.) cell 1. Under these conditions, wave Ep generates a diffraction grating due to the propagation of an acoustic wave generated by the electrostrictive effect at the focal position. The phase of wave Es back-scattered by the diffraction grating is then the conjugate of the incident wave Ep. In an oscillator-amplifier laser structure, phase conjugation dynamically compensates for phase distortion caused by the laser amplifier medium thermal lens. In practice, the quality and stability of the conjugate wave are limited by several phenomena which oppose the Brillouin effect:

defocussing due to residual absorption of the beam in the cell, the Raman effect, the autofocussing effect due to the electrostrictive displacement of material around the focal point.

In addition, because the mechanism relies on the light noise diffused by the acoustic phonons in the medium, it is preferable to use a controlled optical signal to initiate the Brillouin back-diffusion phenomenon. This invention aims to satisfy this last requirement and, simultaneously, to reduce the energy densities at the focal point. Consequently, unwanted non-linear effects are considerably reduced, significantly improving the long-term stability of the reflectivity and the precision of the conjugate wave.

SUMMARY OF THE INVENTION

The invention therefore provides a device using the Brillouin effect and including at least one non-linear medium, wherein an optical focussing system with at least two focal points in the non-linear medium focuses light at these two points.

BRIEF DESCRIPTION OF THE DRAWINGS

The invention will be better understood and other advantages will become clear upon reading the following description in association with the appended drawings of which.

DETAILED DESCRIPTION OF THE INVENTION

Figure 1:
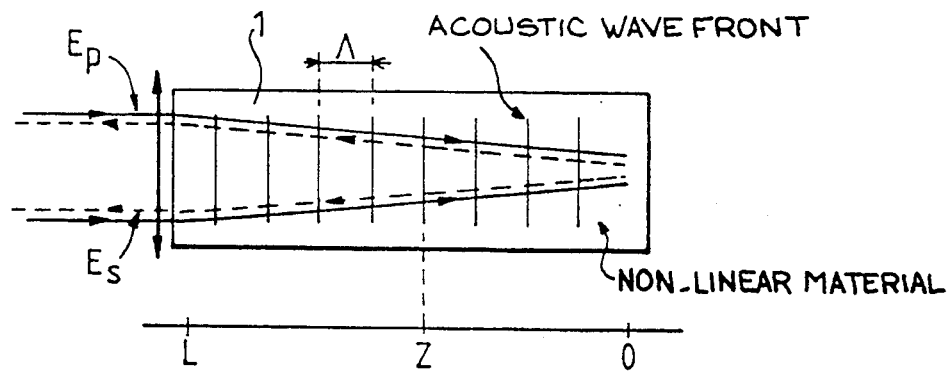
FIG. 1 represents a Brillouin-effect gas cell based on phase conjugation, as known to the prior art and already described.
Figure 2A:
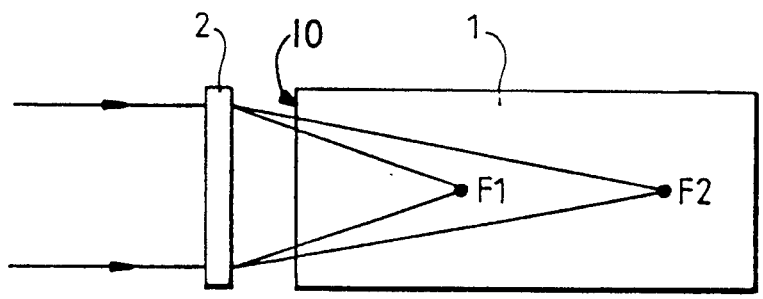
FIGS. 2a and 2b represents a general example of an embodiment of the invention.

We shall first describe a general example of an embodiment of the invention, referring to FIG. 2.

The device includes a non-linear photosensitive medium 1 with an inlet face 10. An optical system 2 applies an optical beam Ep to the inlet face 10. This optical system allows the optical beam to be focussed at two points $F_1$ and $F_2$ within the photosensitive medium 1.

Figure 2B:
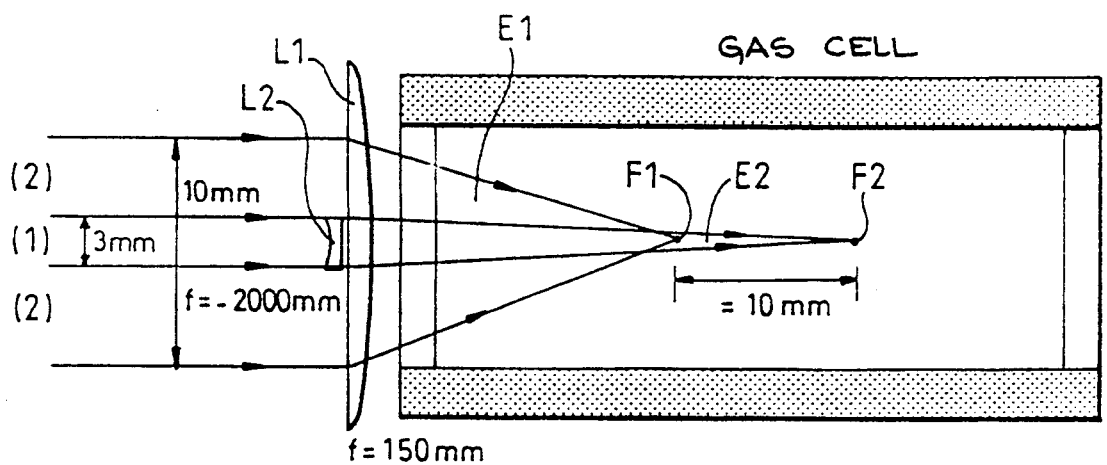

FIG. 2b represents, as an example, a more derailed embodiment. It includes the following components:

a non-linear medium 1, for example a gas cell, a lens $L_1$ with a focal length $F_1$ (for example, 150 mm), a lens $L_2$, concentric with lens $L_1$. The combined focal length of lenses $L_1+L_2$ is such that the focal point lies at $F_1+aF$ (aF=10 mm). FIG. 2b shows $L_1$ and $L_2$ as two separate lenses but these could be replaced by a single bifocal lens. This focussing device gives very good phase conjugation conditions with the following performance:

Reflectivity: 70–60%,

Incident energy: 50–100 mJ,

Frequency: 30 Hz

No breakdown of the gaseous medium.

Figure 3:
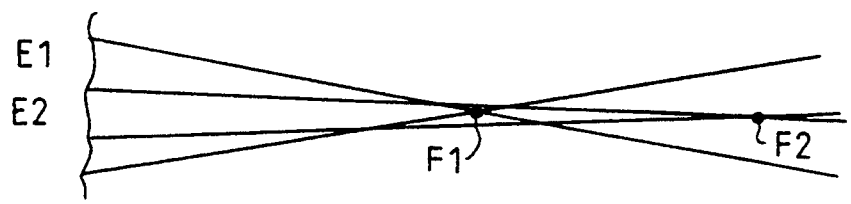
FIG. 3 represents a more detailed embodiment of a Brillouin effect device according to the invention.
Figure 3:
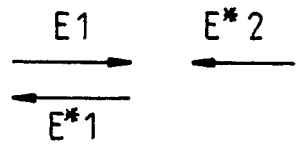
Figure 4:
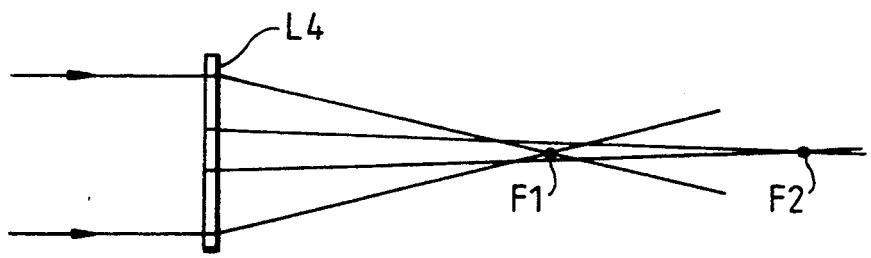
FIG. 4 illustrates the operation of the device represented in FIG. 2.

The stability of the performance over several hours can be analyzed as follows:

The central beam $F_2$, which contains 50–60% of the incident energy, generates a self-pumped conjugate beam $E^*_2$ which forms a beam to sound the incident wave $F_1$ outside lens $L_2$. The zone in which these two beams $E_1$ and $E^*_2$ overlap around focal point $F_1$ can be considered as the seat of an interaction between a forward-travelling and a backward-travelling wave (FIGS. 3 and 4). This interaction generates a conjugate wave $E^*_1$ whose properties are controlled by the conjugate sounding wave $E^*_2$. The configuration partially acts as an interaction between two waves, reducing the threshold energy compared to the self-pumped structure and ensuring greater stability of the conjugate wave generated (sounding by injection).

Figure 5:
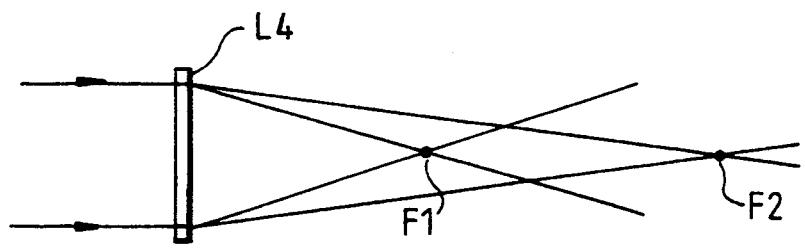
FIGS. 5 and 6 represent variant embodiments of the device according to the invention.
Figure 6:
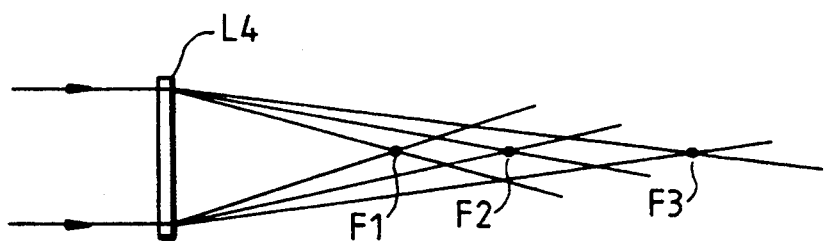

The focussing device described above can be replaced by a holographic lens $L_4$ which generates two focal points $F_1$ and $F_2$ whose geometrical positions are determined by the recording configuration (FIGS. 4 and 5). (Recording on high-efficiency polymer material). FIG. 6 describes a device extended to generate N longitudinal multiple focal points. A holographic device $L_4$ makes it possible to record several holographic lenses with focal points $F_1$, $F_2$, $F_3$. Such a device could be produced using any other technique capable of producing several optical focal points within the non-linear medium 1.

Throughout the above description, a gas cell has been used as an example of a non-linear medium. However, any other solid or liquid non-linear medium can also be used.

In particular, a liquid non-linear medium such as $CS_2$, benzene or $SnCl_4$, is suitable for this type of device.

In addition, all the above description is based on the Brillouin effect but any other effect capable of generating a conjugate wave, for example the Kerr effect, can also be used.

What is claimed is:

1. A phase conjugation device including at least one non-linear medium and also including an optical focussing system with at least two focal points lying in the non-linear medium, the optical system focussing at least two portions of an incident light wave at respective ones of said at least two focal points.

2. A device as claimed in claim 1 wherein the said non-linear medium uses the Brillouin effect to generate a wave which is a conjugate of the incident wave.

3. A device as claimed in claim 1 wherein the non-linear medium is a gas cell.

4. A device as claimed in claim 1 wherein the non-linear medium is a liquid medium.

5. A device as claimed in claim 4 wherein the liquid medium is $CS_2$, $SnCl_4$ or benzene.

6. A device as claimed in claim 1 wherein the non-linear medium is a solid medium.

7. A device as claimed in claim 1 wherein the focal points are aligned along the optical axis of the optical system.

8. A device as claimed in claim 4 but including more than two focal points.

9. A device as claimed in claim 4 wherein the optical device includes at least two concentric lenses.

10. A device as claimed in claim 4 wherein the optical device includes a holographic device in which at least two focussing elements have been recorded.

* * * * *